United States Patent Office 3,502,504
Patented Mar. 24, 1970

---

3,502,504
ELECTRIC STORAGE BATTERIES
Charles Arthur John White, Redditch, England, assignor to Alkaline Batteries Limited, Redditch, England, a company of Great Britain
Filed Jan. 26, 1968, Ser. No. 700,762
Claims priority, application Great Britain, Jan. 30, 1967, 4,540/67
Int. Cl. H01m 35/00
U.S. Cl. 136—6                                        10 Claims

ABSTRACT OF THE DISCLOSURE

A sealed electric storage cell of alkaline type has certain areas of the upper parts of the plates separated by thin absorbent separator material while other areas have a clear path for gas to flow between plates of opposite polarity, and the upper parts of the plates are mounted in a compartment open at the bottom.

---

Figure 1:
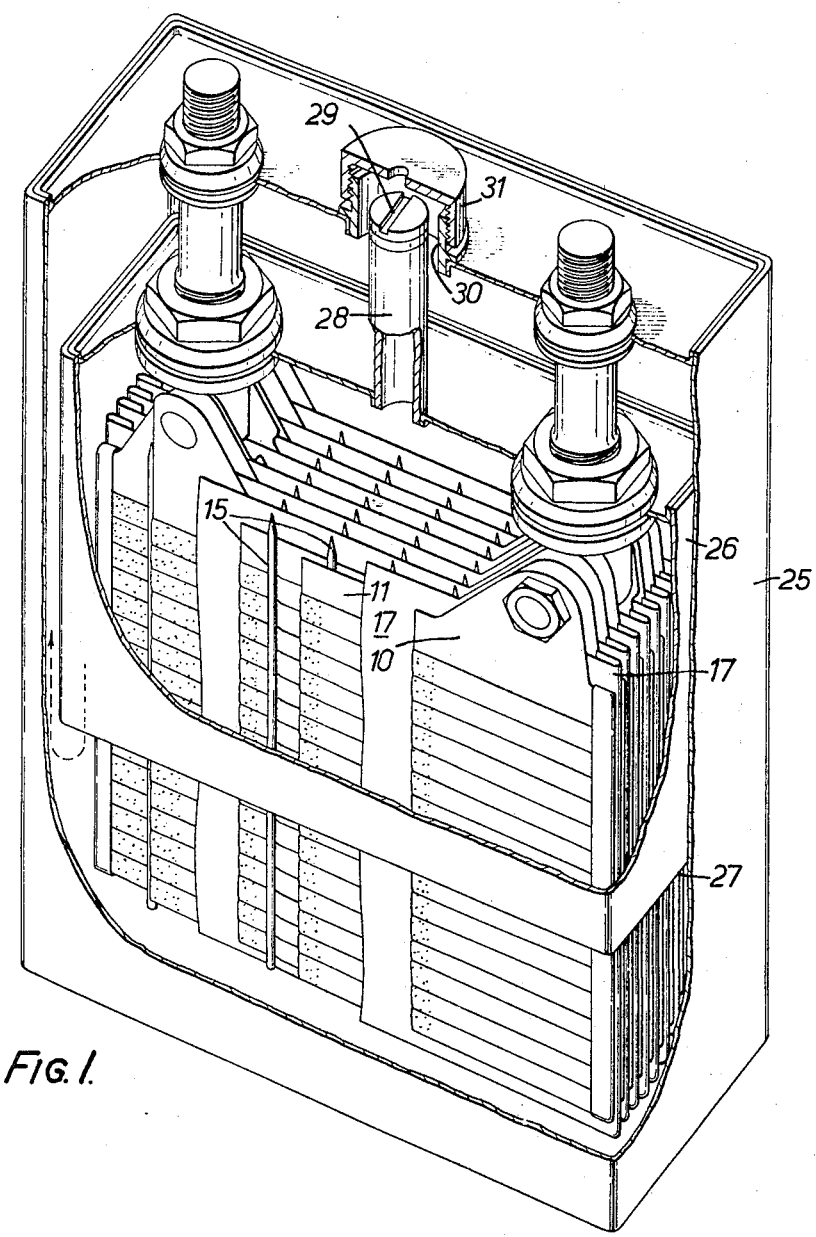

This invention relates to electric storage cells of the alkaline type.

According to the present invention certain areas of at least the upper part of the plates of opposite polarity are separated by absorbent separating material which even when not immersed, will retain sufficient absorbed electrolyte to provide effective conduction between the plates, while other areas of the said upper part, when not immersed, are such as to leave a clear path for gas to flow between the plates of opposite polarity, the upper parts of the plates being mounted in a compartment which is closed at the top but communicates below the liquid level with an expansion space, so that if gases are evolved they can depress the liquid level below the top of the plates so that the latter are no longer immersed.

In one form of the invention the gaps on opposite sides of a plate are occupied by different types of separator, one type comprising absorbent material, which, even when not immersed will retain absorbed electrolyte to provide effective conduction between the plates, while the other type, when not immersed, is such as to leave a clear path for gas to flow between plates of opposite polarity. For example the latter type of separator may be the rod or pin type. In such an arrangement it may be convenient to make the spacing between adjacent plates nonuniform, pairs of plates separated by an absorbent separating material being closer together than pairs separated by nonabsorbent material.

In another form of the invention certain areas of at least the upper portion of a face of a plate are in contact with absorbent separator material while neighboring areas of the same face are exposed so as to leave a clear path for gas to flow between them and opposed areas of a neighboring plate of opposite polarity. Thus, the plates of opposite polarity may be separated by absorbent separating material provided with gaps or openings in it. In one arrangement the separating material is in the form of a tape wound about each plate of one polarity so as to leave gaps between adjacent convolutions.

The expansion space may be open to atmosphere or it may comprise a closed container having a compressible gas in it or provided with a yielding wall.

The present invention may be applied to a gas-tight cell, namely one that during normal use, both when charging and discharging, has no venting means for the release of gas at atmospheric pressure. The term is not intended to exclude the provision of a safety valve or other safety device which operates only in emergency, nor a removable gas-tight plug or stopper, although normally a gas-tight cell would be sealed at the factory and intended to remain sealed throughout its life. In applying the present invention to a gas-tight cell the initial evolution of gas could take place without excessive rise of pressure by expelling a corresponding quantity of liquid into the expansion space. This would drain the liquid from the upper portions of the plates and in particular from the spaces between the plates in which the evolved gases would collect, and in which they would tend to be absorbed or recombined so as to prevent further build up of pressure.

The present invention is, however, also applicable to vented cells from which gases evolved can escape at atmospheric pressure (or very slightly above it) so that the problem of preventing dangerous build up of gas pressure does not arise. In such cells it may nevertheless be desirable to prevent loss of electrolyte by electrolysis so as to reduce or eliminate the necessity for the electrolyte to be topped up by regular additions of distilled water.

Figure 2:
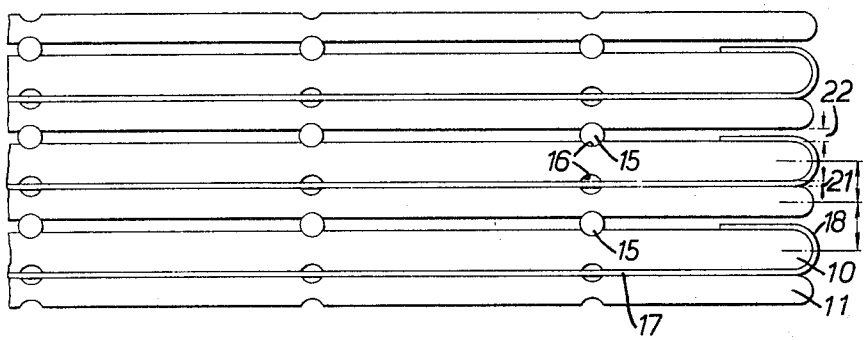
Figure 3:
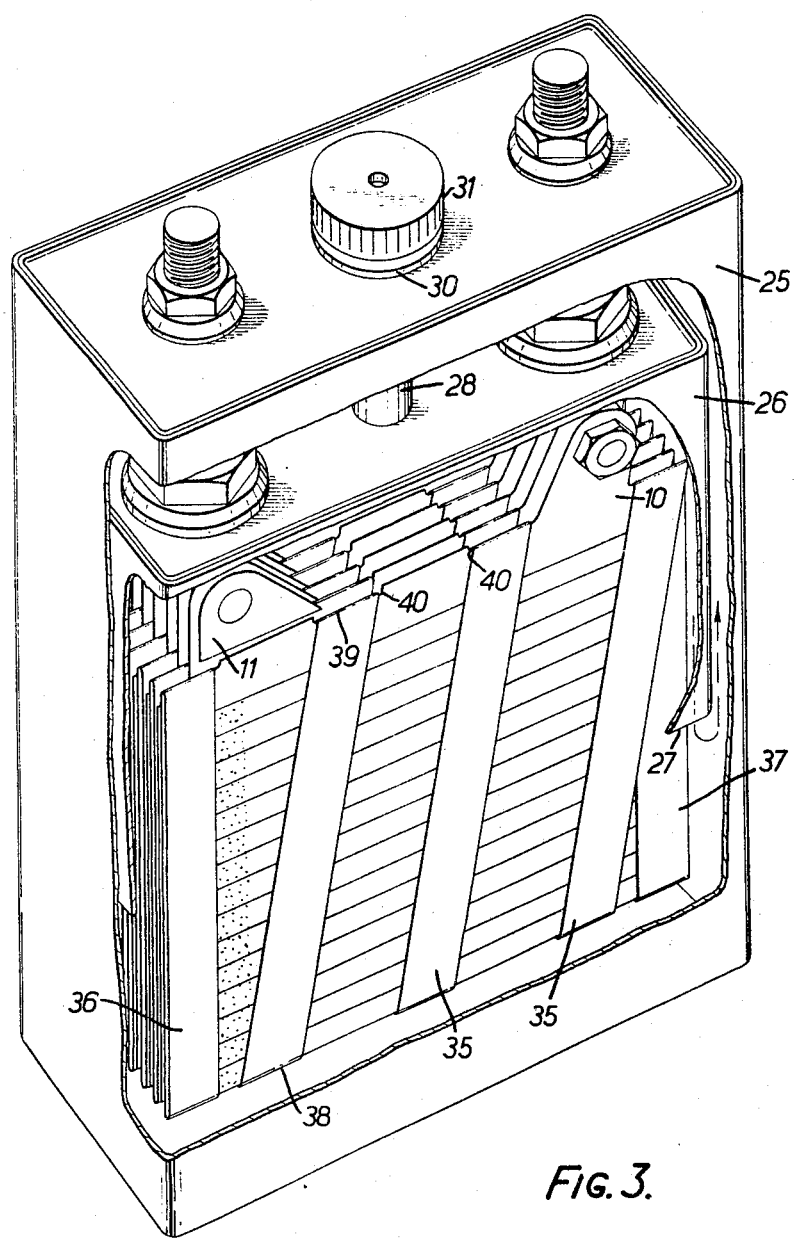

The invention may be put into practice in various ways but two specific embodiments (and certain modifications) will be described by way of example with reference to the accompanying drawings in which:

FIGURE 1 is a perspective view, with parts broken away, of an alkaline nickel-cadmium cell embodying the invention, FIGURE 2 is an enlarged fragmentary diagrammatic sectional plan view through the plates and separators of FIGURE 1, and FIGURE 3 is a perspective view similar to FIGURE 1 of a modified construction.

In each embodiment an alkaline nickel-cadmium cell is provided with the usual element comprising interleaved positive and negative plates 10 and 11 of the well known pocket type, comprising metallic pockets packed with active material.

In the construction of FIGURES 1 and 2 the separating material between the plates is of two different types arranged alternately so that each plate has one type of separator on one side and the other type on the other side. One type of separator is of the well known rod or pin type comprising spaced parallel vertical rods 15 of hard rubber or suitable plastics material which may be partially received in grooves 16 in the plates which serve to locate the rods. The other type of separating material comprises a porous absorbent sheet material 17 of woven or felted form covering the whole face of the plate and wrapped round its edge at 18 so as to extend a short distance into the gap occupied by the rod type separators. The spacing 21 between plates separated by the absorbent separating material will be equal to the thickness of that material (for example .008″) and may be appreciably less than the spacing 22 between plates separated by the rod type separators.

The negative plates are provided with excess negative active material whereby they are of greater capacity than the positive plates so that during the later stages of a charging operation, and during any overcharge, there will be a preferential liberation of oxygen gas from the positive plate, and no liberation of hydrogen.

The cell has a conventional container 25 provided with an inner compartment 26 in which the upper part of the element is located. The inner compartment is open at the bottom and its lower edge 27 lies somewhat less than half way down the plates.

The inner compartment has a filling tube 28 which is closed by a gas-tight screw plug 29 and projects into a filling bush 30 in the outer compartment. The bush 30 is provided with a vented cap 31. The cell is filled with electrolyte in the ordinary way to a level slightly above the top of the plates, the plug 29 being removed to allow the level to be the same in the inner and outer compartments, and then inserted.

Accordingly, when gases are evolved from the plates they collect in the upper part of the inner compartment and force liquid out of the inner compartment into the outer compartment, thereby draining the liquid from the upper portions of the plates and separators.

The absorbent separators remain wetted by absorbed liquid electrolyte so that the operation not merely of the lower parts but also of the upper parts of the plates can continue, although the spaces between opposite faces of the upper parts of plates separated by the rod type separators are no longer flooded with electrolyte. Accordingly, for example at the end of a charging period, the upper portions of the plates will not be deprived of their full charge but will nonetheless play their part in effecting absorption or recombination of the gas and hence reducing loss of electrolyte due to electrolysis.

In the event of gas being evolved at an exceptionally high rate (for example due to an excessively high charge rate) the liquid level in the inner compartment may fall to the lower edge of the inner compartment so that gas will then escape to the outer compartment and be vented from it. Thus the arrangement fixes a minimum level of electrolyte at which the absorbent separating material will always be dipping in electrolyte so as to draw it up by capillary action and remain wet.

So long as the plates are flooded with electrolyte, or to the extent that they are so flooded, the use of separators of rod or pin type gives a minimum internal resistance. In addition it ensures rapid draining of electrolyte from opposed faces of the plates when gases are evolved, and affords gas evolved at one plate unobstructed access to an opposed plate.

In an alternative construction the inner compartment extends down to the bottom of the plates, and helps to provide mechanical support for them. In this case it may have an opening about half way down and its operation will be the same as that of the construction shown in FIGURES 1 and 2. Alternatively it may have no such opening since for the length of time that the plates are drained of free electrolyte they can rely on absorbed electrolyte.

In a further embodiment the same separator material of absorbent type (but of greater thickness, e.g., .020″ to .030″) is employed in all the gaps between plates, but is formed so as to leave certain areas of the plates exposed to corresponding areas of neighbouring plates.

This may be done by providing openings in a sheet of the material covering the whole face of the plate, but in a preferred arrangement shown in FIGURE 3 a separator 35 of tape or ribbon form is employed which is wound round each plate, or each plate of given polarity, for example each positive plate, in the form of a flattened helix.

Thus a strip of the tape may extend (as at 36) round both faces of one vertical edge of the plate and thence pass obliquely up and down round the lower edge 38 and the upper edge 39 alternately, progressing towards the opposite vertical edge, where it again has a vertical convolution 37 covering both faces of the plate. The upper and lower edges of the plate may be formed with recesses 40 to receive and locate the tape.

In other respects the embodiment of FIGURE 3 is similar to that of FIGURE 1 and 2 and corresponding parts bear the same reference numerals. Its operation is also analogous to that of the first embodiment, the relative areas of the plate that are exposed and covered by the absorbent tape being chosen to ensure that there is sufficient areas exposed to promote recombination of the gases, without excessively reducing the area covered by absorbent separator material permitting current to continue to flow when the area is not flooded with electrolyte.

The constructions described are particularly advantageous where charging is from a constant potential source, the current being high initially and falling to a low value as charging is completed. In these circumstances, since gassing occurs only late in the charge at a relatively low rate, the fall in electrolyte level is small and a high cell performance on discharge is available on demand.

In the embodiments specifically described, the expansion space to which the liquid can be expelled is provided by an outer compartment of the container which is vented to atmosphere. It will, however, be appreciated that many other forms of expansion space may be employed. Thus, fro example, part of the wall of the enclosure may be afforded by a bellows or diaphragm, the other side of which either communicates with the atmosphere or forms parts of a closed space containing a compressible gas. Thus the invention can also be applied to a gas-tight cell by the use of any suitable form of compressible cushion, whether having a solid wall or a gas exposed to the liquid.

What I claim as my invention and desire to secure by Letters Patent is:

1. A battery of the alkaline flooded type, comprising:
   a casing forming a first compartment,
   positive and negative plates mounted within said first compartment in interleaved relationship,
   a second compartment mounted within said casing to completely enclose the upper portions only of said positive and negative plates, said second compartment extending below the liquid level and communicating with an expansion space within said first compartment so that gases evolved in the operation of the battery depress the free liquid level below the upper portions of the positive and negative plates,
   means for separating each of said positive and negative plates, said means including an absorbent material for retaining sufficient liquid to maintain conduction between the portion of said plates free of liquid and said means for separating also providing a clear path for gasses to flow between the portions of adjacent plates which are above the free liquid level.

2. A battery as claimed in claim 1 wherein said means for separating further includes spacing elements, said absorbent material is mounted to one face of each plate to maintain said conduction betwen adjacent portions of said plates and said spacing elements are mounted to the other face of each plate to provide said clear path for gases to flow.

3. A battery as in claim 1 wherein said second compartment includes a liquid-filling tube and a plug engaging said tube to prevent gas from escaping from said second compartment.

4. A battery as claimed in claim 2 in which said spacing elements are of the rod type.

5. A battery as claimed in claim 2 in which pairs of plates separated by said absorbent separating material are closer together than pairs of plates separated by said spacing elements.

6. A battery as claimed in claim 1 in which areas of at least the upper portion of the faces of said plates are in contact with absorbent material and the remaining areas of the faces are substantially exposed so as to leave a clear path for gas to flow between them and opposed areas of an adjacent plate of opposite polarity.

7. A battery as claimed in claim 6 in which the plates of opposite polarity are separated by absorbent separating material provided with openings in it.

8. A battery as claimed in claim 6 in which the separating material is in the form of a tape wound about each plate of one polarity so as to leave gaps between adjacent convolutions.

9. A battery as claimed in claim 1 in which the expansion space is open to the atmosphere.

10. A battery as claimed in claim 1 in which the expansion space comprises a closed container having a compressible gas in it or provided with a yielding wall.

References Cited

UNITED STATES PATENTS

| | | | |
|---|---|---|---|
| 3,023,258 | 2/1962 | Peters | 136—6 |
| 3,117,033 | 1/1964 | Bachmann | 136—6 |
| 3,119,722 | 1/1964 | Tietze et al. | 136—6 |
| 3,162,549 | 12/1964 | Jeannin | 136—143 |
| 3,208,881 | 9/1965 | Fallon | 136—6 |

FOREIGN PATENTS

| | | |
|---|---|---|
| 776,198 | 6/1957 | Great Britain. |

WINSTON A. DOUGLAS, Primary Examiner

C. F. LEFEVOUR, Assistant Examiner

U.S. Cl. X.R.

136—179